United States Patent Office 3,399,188
Patented Aug. 27, 1968

3,399,188
YELLOW DISAZO DYES
Ray Allen Clarke, Pitman, and Dale Miller Griffin, Jr., Woodstown, N.J., assignors to E. I. du Pont de Nemours and Company, Wilmington, Del., a corporation of Delaware
No Drawing. Filed Nov. 23, 1964, Ser. No. 413,310
7 Claims. (Cl. 260—152)

ABSTRACT OF THE DISCLOSURE

Yellow disazo dyes of the structure

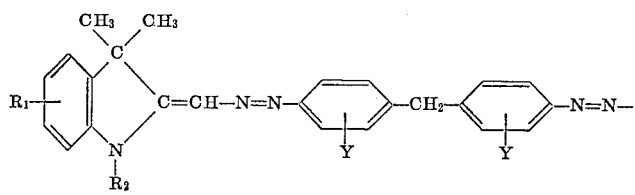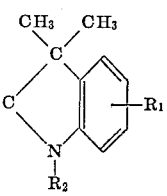

and the acid salts of these dyes are useful in black hectograph and spirit inks. Typical black dyes include a dye or dye salt of the above structure, Crystal Violet and Victoria Blue B, or a dye or dye salt of the above structure, Crystal Violet and Victoria Pure Blue BO.

This invention is directed to novel yellow disazo dyes and their use in hectograph or spirit inks, particularly in the production of spirit blacks.

The black inks generally used in hectograph systems consist essentially of mixtures of a yellow Chrysoidine dye with basic dyes such as Crystal Violet, Brilliant Green and Victoria Blue. The resulting black mixtures, however, exhibit unsatisfactory properties which are caused by the yellow component. For example, they show a shift in shade toward the blue or red as the copy run continues. Other shortcomings of the known blacks include their hydrolytic instability, their thermal instability, and the tendency of their yellow component to transfer from copy images to adjacent paper during storage. Although these deficiencies are known to be caused by Chrysoidine dyes, identified as C.I. 11,270 and C.I. 11,320, attempts in the past to find a superior substitute have been unsuccessful.

German Patent 1,044,588 represents the closest prior art and in Example 6 discloses a copy black made from malachite green, methyl violet, fuchsine and a yellow azo dye made by coupling diazotized aniline to 1,3,3-trimethyl-2-methyleneindoline (Fischer's Base); this yellow dye, when tested in various black mixtures with basic blues, violets and greens, always transfers from copy images to adjacent paper upon storage even for short periods of time such as 8 to 24 hours. These yellow transfer markings are, of course, objectionable in the trade. This German patent discloses other yellows made from Fischer's Base and tetrazotized aryl diamines such as diaminodiphenyloxide and benzidine. Spirit Blacks made from these yellow dyes do not exhibit the objectionable transfer properties but they are inferior to black mixtures made by using the novel yellow dyes of the present invention. Their inferiority is observed in the following tests: (a) Uneven tone during the copy run, say from 10 to 300 copies. The original black mixture gives progressively bluer or redder copies as more copies are made. (b) Said prior art yellow dyes exhibit weakness, as observed in the black copies, as compared with black mixtures made from equal amounts of the novel yellow dyes of the present invention.

It has been discovered that the yellow dyes of the present invention are free of the heretofore described well known prior art shortcomings and, in addition, possess highly desirable properties which have overcome problems heretofore existing in the manufacture and use of hectograph blacks. The novel yellow dyes of the present invention exhibit the following desirable properties as observed in the black mixtures:

(a) hydrolytic stability at high temperatures during manufacture of the spirit blacks,
(b) thermal stability during high temperature coating of the carbon paper sheets,
(c) even tone throughout the copy run, dissolves rapidly,
(d) good strength of the yellow component, and
(e) good compatibility with basic dyes and with hectograph vehicles.

More specifically, the novel yellow dyes of this invention are made by tetrazotizing a 4,4'-diaminodiphenylmethane of the structure:

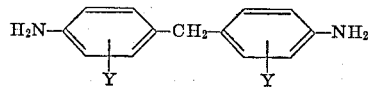

wherein Y is H, F, Cl or Br, a $C_{1-4}$ alkyl group, methoxy or ethoxy, followed by coupling in acidic medium to a 2-methyleneindoline of the structure

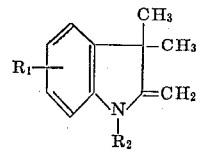

wherein $R_1$ is H, F, Cl, Br, methoxy or ethoxy, and $R_2$ is methyl or phenyl. The rseulting disazo dye is isolated either in base form or as its acid salt.

The novel dyes of the present invention, in free base form, have the structure:

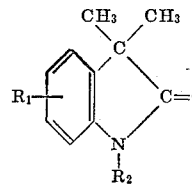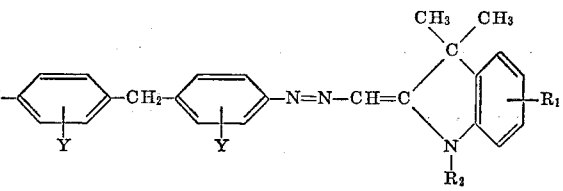

wherein $R_1$, $R_2$ and Y are as heretofore defined.

Embodiments of this invention include:

(a) A black dye mixture comprising a novel dye as heretofore described intimately mixed with basic dyes of the triarylmethane series.
(b) A hectograph ink comprising the dye mixture of (a) intimately mixed with a hectographic ink vehicle.
(c) A process for the production of hectograph carbon papers wherein the ink of (b) is evenly coated on the surface of paper.
(d) A process for the spirit copying of images transferred to a master sheet from a carbon paper of (c).

Representative examples further illustrating the present invention follow.

EXAMPLE I (a) To a mixture of 3000 parts of water and 518 parts of 37% hydrochloric acid are added 198 parts (1 mole) of 4,4'-diaminodiphenylmethane. The mixture is stirred until all the diamino compound dissolves. To the mixture is added ice sufficient to lower the temperature to 0–5° C. Tetrazotization is accomplished by the addition of a solution of 144 parts (2.09 moles) sodium nitrite in 500 parts of water over a period of 5–20 minutes, maintaining a temperature of 0°–5° C. by the addition of ice as necessary. An excess of nitrous acid as shown by a reaction on starch-iodide paper is maintained for 10–20 minutes by small additions of sodium nitrite solution if necessary. The excess nitrous acid is then removed by adding sulfamic acid until the reaction mixture gives no test for nitrous acid with starch-iodide papers. To the mixture are added 348 parts (2.01 moles) of Fischer's Base (1,3,3-trimethyl-2-methyleneindoline) over a 30 to 45 minute period, with temperature being maintained at 0°–10° throughout. Sodium carbonate, as a 10–20% aqueous solution, is added to maintain a pH in the range 3.5–5.0 until coupling is complete as shown by the absence of a test for diazo compound, e.g. by streaking a sample of the reaction mass on a filter paper wet with alkaline H-Acid solution. The dye precipitates during the coupling to form an orange slurry. During the coupling, the temperature is allowed to rise freely. Coupling is usually complete in two to four hours. When coupling is complete, 37% hydrochloric acid is added to the mass in an amount sufficient to make a concentration of 0.5 to 1.0% HCl in the mass. The mass is heated to 50°±10° C. for one to two hours to insure formation of the dihydrochloride of the dye. The slurry, after cooling to 25°±5° C., is filtered and the filter cake is washed with 2000 to 3000 parts of 0.3–0.5% aqueous hydrochloric acid solution. The filter cake may be dried, but is usually used as a wet paste. The dye thus obtained has the structure:

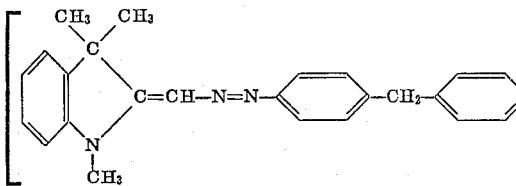

Analysis of the yellow dye of Example I(a)

Drying the yellow dye of Example I(a) at 100° C. for 24 hours yields a product containing 3.3% water as determined by titration with Karl Fischer reagent. Titration of a sample of this dried dye with standard sodium hydroxide shows it to contain 10.8% hydrochloric acid. The calculated hydrochloric acid content for the dye $$C_{37}H_{38}N_6 \cdot 2HCl$$

containing 3.3% water is 11.04%.

(b) When the procedure of part (a) of this example is followed except that the 4,4'-diaminodiphenylmethane is replaced by 267 parts of 4,4'-diamino-3,3'-dichlorodiphenylmethane, a redder yellow dye is obtained which has similar properties. Also, by replacing the diamine in part (a) with, respectively, 234 parts of 4,4'-diamino-3,3'-difluorodiphenylmethane or with 356 parts of 4,4'-diamino-3,3'-dibromodiphenylmethane, yellow hectograph dyes are obtained.

(c) When the procedure of part (a) is repeated except that the 4,4'-diaminodiphenylmethane is replaced by 226 parts of 4,4'-diamino-3,3'-dimethyldiphenylmethane, a yellow dye having similar properties is obtained. Likewise, similar dyes are obtained when chemically equivalent amounts of 4,4'-diamino-3,3'-diethyldiphenylmethane or of 4,4'-diamino-3,3'-dibutyldiphenylmethane are employed as the aromatic diamine in this example.

(d) When the diamine used in part (a) of this example is replaced by 258 parts of 4,4'-diamino-3,3'-dimethoxydiphenylmethane, or by 286 parts of 4,4'-diamino-3,3'-diethoxydiphenylmethane yellow dyes having similar properties are obtained.

Yellow dyes as free bases (e) The yellow dye of part (a) of the present example may be isolated as the free base if desired. At the end of the coupling reaction, as shown by the disappearance of a test for active diazonium compounds, bases such as sodium hydroxide, sodium carbonate or ammonia are added to the reaction slurry to adjust the pH to a value 8 or higher. This pH is maintained by addition of more base as necessary until a steady pH value is obtained, showing that no more acid salt of the dye remains to be neutralized. The free color base is isolated by filtration and is washed free of salts with water.

Alternatively, after the dye is isolated as the dihydrochloride salt as in Example I(a) it is re-slurried in water followed by addition of bases as above to convert the dye salt to the free base, which is isolated by filtration and washing.

If desired, dye salts utilizing acids other than hydrochloric may be employed. Other acids include sulfuric, phosphoric, p-toluenesulfonic and the like which are reacted with the dye in its free base form. For use in hectograph inks the hydrochloride salts are preferred.

Although the novel yellow dyes may be used as free bases in hectograph inks this form is not preferred because of the high solubility of the dye bases in the oil vehicles.

EXAMPLE II (a) In the process of Example I(a) the coupling component 1,3,3-trimethyl-2-methyleneindoline is replaced by 436 parts of 5-ethoxy-1,3,3-trimethyl-2-methyleneindoline. A strong spirit soluble yellow dye is obtained. Likewise, a chemically equivalent amount of the corresponding 5-methoxy indoline coupler gives a yellow dye having similar properties.

(b) In the process of Example I(a) the 1,3,3-trimethyl-2-methyleneindoline is replaced by 417 parts 4-chloro-1,3,3 - trimethyl - 2 - methyleneindoline and, respectively, with 417 parts of 5 - chloro - 1,3,3 - trimethyl - 2 - methyleneindoline to give strong, spirit soluble yellow dyes.

Mixtures of yellow dyes are obtained by using mixed 4,4' - diaminodiphenylmethanes which are prepared by condensing two moles of a mixture of aromatic monoamines with one mole of formaldehyde in acidic medium by known methods. Typical amines used in this reaction are the following: aniline, o-chloroaniline, o-fluoroaniline, o-bromoaniline, o-anisidine, o-phenetidine, o-toluidine, o-ethylaniline, o-propylaniline, o-butylaniline. Likewise any of the diamines or mixtures of any of the diamines employed herein, such as a 50:50 mixture of 4,4'-diaminodiphenylmethane and 4,4'-diamino-3,3'-dimethyldiphenylmethane may be tetrazotized and coupled with any of the Fischer's base compounds named above to obtain yellow dyes having excellent properties for use in hectograph inks.

EXAMPLE III (a) To an open, heated vessel equipped with an efficient agitator are added Crystal Violet (C.I. 42,555) wet filter cake equivalent to 74 parts of 100% dye, a quantity of the wet yellow dye of Example I(a) equivalent to 115 parts of dry dye, and Victorian Blue B (C.I. 44,045) wet filter cake equivalent to 30 parts of 100% dye. The mixture is heated with stirring to a temperature of 100°–115° C. During the heating the dyes melt to form a homogeneous tar. Heating at 100°–115° C. is continued until the tar becomes so thick as to be just pourable. The molten, thickened tar is poured into a pan and dried at 80°–95° C. preferably in vacuum, to a constant weight. The dry dye is finely pulverized for use in preparing hectograph inks.

(b) In the process of Example III(a) the yellow dye is replaced by a like amount of the yellow dye prepared by the procedure of Example I(b), used as a water-wet filter cake. An excellent hectograph black is obtained.

(c) In the process of Example III(a) the 30 parts of Victorian Blue B is replaced by a like amount of Victorian Pure Blue BO (C.I. 42,595) or of Brilliant Green (C.I. 42,040) to provide hectograph blacks having excellent working properties.

(d) Following the procedure of Example III(a) a black is prepared from 115 parts of the yellow dye of Example I(c), 60–70 parts of methyl violet (C.I. 42,535) and 20 to 30 parts of Brilliant Green (C.I. 42,040).

A similar black hectograph dye is obtained when the yellow dye of Example I(c) is replaced by 115 parts of the yellow dye of Example II(a).

EXAMPLE IV

Preparation of spirit blacks by dry-mixing of component dyes (a) Fifty parts of the dry, yellow dye of Example I(a) are mechanically mixed with 35 parts of dry Crystal Violet (C.I. 42,555) and 20 parts of dry Victorian Blue B (C.I. 44,045). Two to five percent or more of mineral or other oil based on total dye weight may be added as an anti-dusting agent. This mixture is used to prepare hectograph inks in the same manner as mixtures prepared by melting the wet dyes together and drying.

(b) When Methyl Violet (C.I. 42,535) is used in place of Crystal Violet, or when Victorian Pure Blue BO (C.I. 42,595) is used in place of Victorian Blue B in part (a) of the present example excellent spirit black dyes are obtained. The amounts of dyes used may, of course, be varied depending on the degree of redness or greenness desired in the final product.

It is to be understood that other basic triarylmethane dyes may be used in Examples III and IV in lieu of those named therein. For instance the following dyes may be used in mixture with the novel yellow dyes of the present invention in order to provide hectograph dyes in varying shades of blue, black and violet: C.I. 42,000, C.I. Basic Green 4; C.I. 42,025, C.I. Basic Blue 1; C.I. 42,500, C.I. Basic Red 9; C.I. 42,510, C.I. Basic Violet 14; C.I. 42,600, C.I. Basic Violet 4; C.I. 44,040, C.I. Basic Blue 11.

EXAMPLE V

Preparation of a typical hectograph ink composition

In a heated vessel at a temperature in the range of 85°–120° C. are placed 65 parts by weight of Carnauba wax, 157 parts of petroleum jelly (Vaseline), 67 parts of mineral oil SAE No. 30, and 10 parts of paraffin wax. This mixture after melting, is stirred until it is homogeneous.

To 100 parts of the molten wax-oil mixture is added an equal weight of the hectograph dye of Example III(a) with agitation to obtain complete wetting of the dye by the vehicle. The resulting hectograph ink is then ground at 85°–120° C. in a ball mill to give a well dispersed suspension of finely ground black dye in the vehicle. The resulting suspension is useful for application in the trade, as described in Example VI.

The amount of dye employed per part of the wax-oil vehicle may vary from about 0.75 to 1.2 parts. Less dye than about 0.75 part/part of vehicle will give weak hectograph copies. More dye than about 1.2 parts/part of vehicle will give viscosities too high to be useful in the trade. Viscosities of hectograph inks used in the trade vary between about 100 to 600 centipoises.

In lieu of ball milling, employed in the present example, one may roller mill the ink, or the ink may be first ball milled folowed by roler milling. In any case, the milling is continued until the desired degree of fineness is reached as determined by a grit gauge or by any other means common to the art of grinding hectograph inks.

The hectograph black dye of Example III(a) may be replaced in the present example by any other hectograph dyes disclosed herein or by mixtures thereof.

EXAMPLE VI

Preparation of the hectograph carbon sheet

The molten hectograph ink of Example V is applied while hot to a moving sheet of paper and the ink thickness is regulated by means of a doctor bar or knife, so that a uniform coating about 0.0005 inch thick is obtained. On cooling, the ink solidifies and the carbon paper is ready for further processing. Normally, the coated sheet thus prepared is assembled with a protective sheet and a master sheet, which assembly is cut to convenient dimensions and is ready for use in duplication processes.

If desired, the cooled carbon paper prior to further processing, is given one more coating of a clear wax which protects the dye-containing coat from abrasion and also prevents transfer of the dye to the hands of a person handling the coated sheet.

It is to be understood that hectograph inks made from other dyes and dye mixtures described in the present invention may be employed to coat paper which is then referred to as carbon paper.

EXAMPLE VII

Use of the hectograph carbon sheet in duplication

Images of symbols are recorded on the master sheet, assembled as described in Example VI, by writing, drawing, typing, etc., as is well known in the trade. The pressure applied by such operations causes the wax-dye dispersion (hectograph ink) to transfer to the master sheet as a reverse or negative image of the symbols used. The master is now separated and then pressed firmly against sheets of copy paper which have been wet with a film of spirit solvent, usually lower alcohols. Dye on the negative master sheet dissolves in the solvent film and transfers to the copy sheet where it appears as a positive reproduction of the original symbols inscribed on the master sheet.

The preceding representative examples may be varied within the scope of the present total specification disclosure, as understood and practiced by one skilled in the art, to achieve essentially the same results. For example, in Example III, the practical percentage range, by weight, of components may be defined as 30 to 40% Crystal Violet; 40 to 60% of the yellow and 5 to 20% of the blue.

As many apparently widely different embodiments of this invention may be made without departing from the spirit and scope thereof, it is to be understood that this invention is not limited to the specific embodiments thereof except as defined in the appended claims.

The embodiments of the present invention in which an exclusive property or privilege is claimed are as follows:

1. Dyes, in free base form, having the structure:

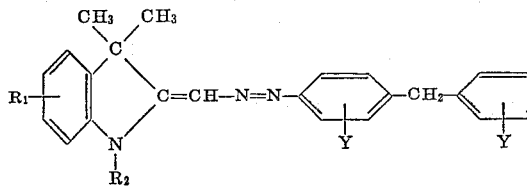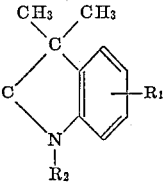

wherein $R_1$ is selected from the group consisting of H, F, Cl, Br, methoxy and ethoxy; $R_2$ is selected from the group consisting of methyl and phenyl; and Y is selected from the group consisting of H, F, Cl, Br, $C_{1-4}$ alkyl, methoxy and ethoxy.

2. The dye of claim 1 in which $R_1$ is H, $R_2$ is methyl and Y is H.

3. Acid salts of dyes which, in free base form, have the structure:

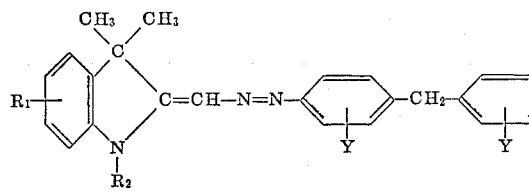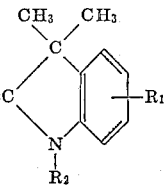

wherein $R_1$ is selected from the group consisting of H, F, Cl, Br, methoxy and ethoxy; $R_2$ is selected for the group consisting of methyl and phenyl; and Y is selected from the group consisting of H, F, Cl, Br, $C_{1-4}$ alkyl, methoxy and ethoxy.

4. The acid salts of claim 3 in which the acid is selected from the group consisting of hydrochloric, sulfuric, phosphoric and p-toluenesulfonic acids.

5. The acid salts of claim 4 in which $R_1$ is H, $R_2$ is methyl and Y is H.

6. The acid salts of claim 3 in which the acid is hydrochloric acid.

7. The dye:

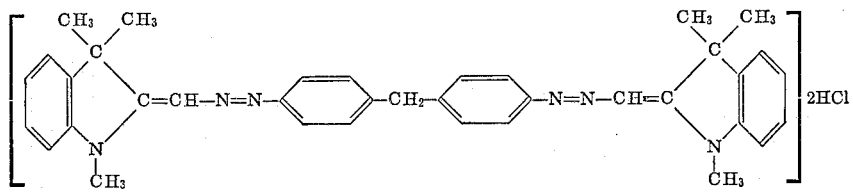

References Cited

FOREIGN PATENTS 1,044,588    5/1959    Germany.

CHARLES B. PARKER, *Primary Examiner.*

D. PAPUGA, *Assistant Examiner.*